April 25, 1939.   P. M. THOMPSON ET AL   2,155,913
FISH SPEARING AND LANDING DEVICE
Filed Feb. 18, 1938   2 Sheets-Sheet 1
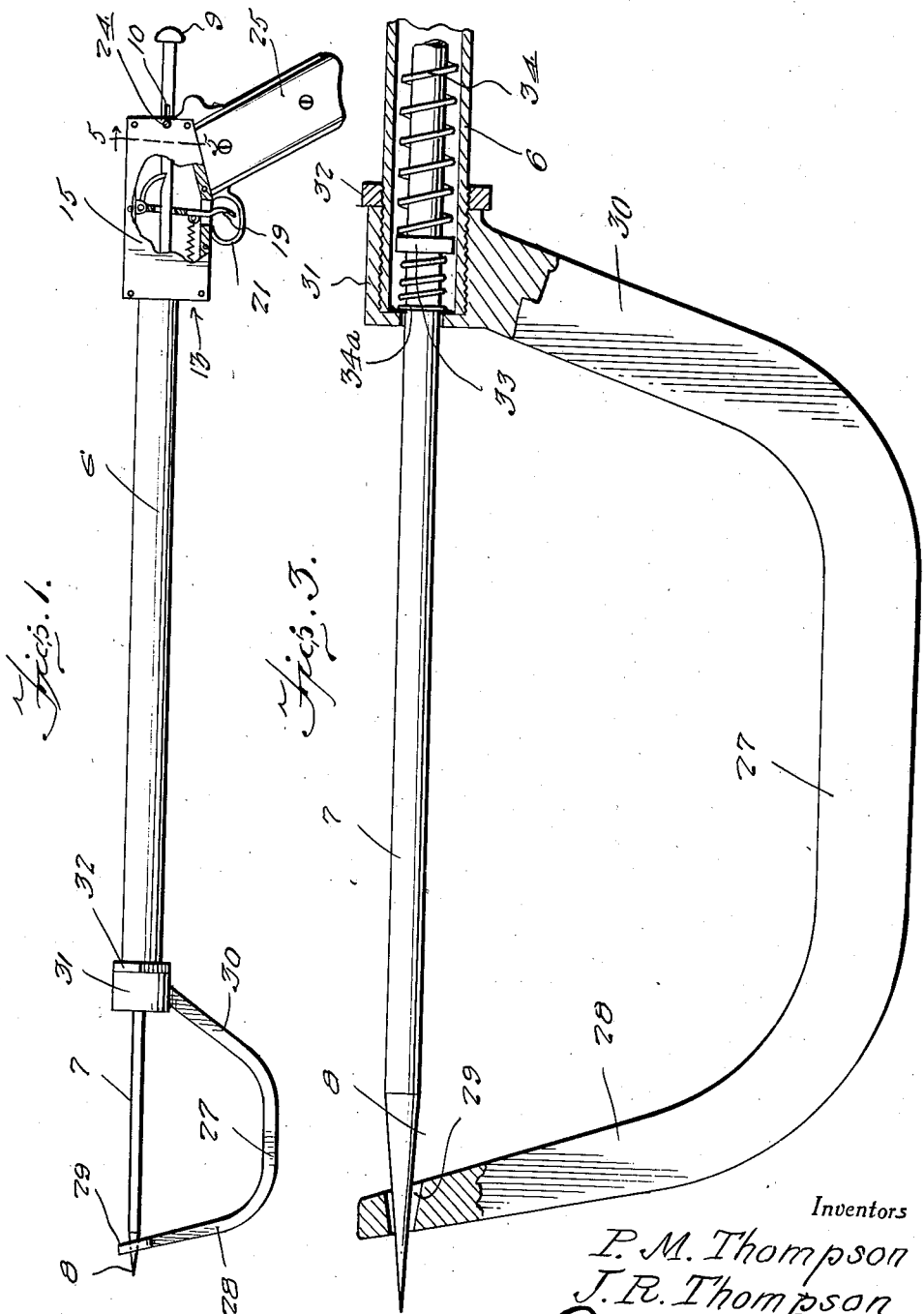
Inventors
P. M. Thompson
J. R. Thompson
By Clarence A. O'Brien
Hyman Berman
Attorneys

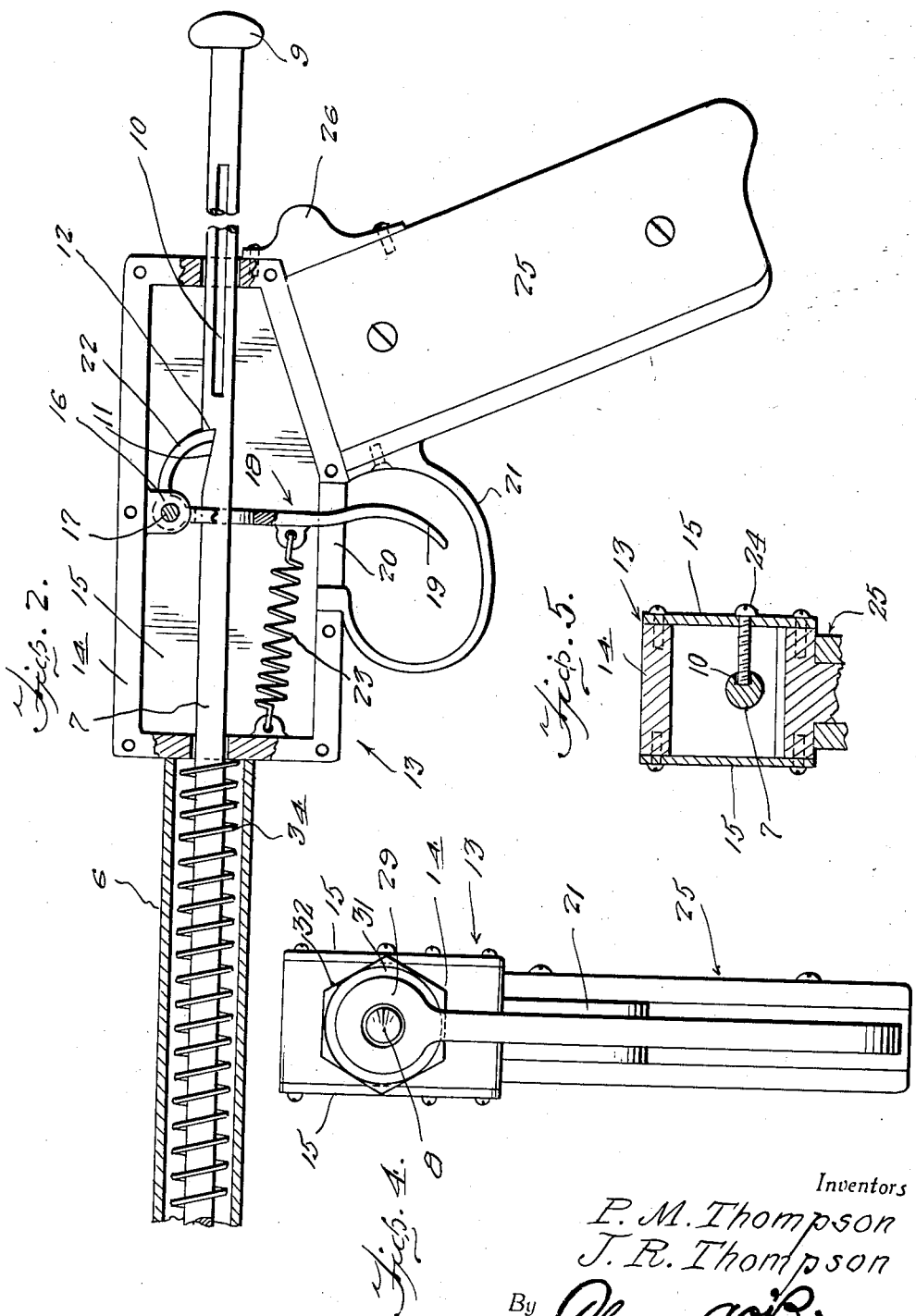

Patented Apr. 25, 1939

2,155,913

UNITED STATES PATENT OFFICE 2,155,913

FISH SPEARING AND LANDING DEVICE

Paul M. Thompson, Luverne, and John R. Thompson, Burt, Iowa

Application February 18, 1938, Serial No. 191,312

5 Claims. (Cl. 43—6)

The present invention relates to a device appropriately constructed for use by anglers, and the particular purpose of the invention is to conveniently spear and hold a fish, before detachment from the fishing line, so as to facilitate making the catch and thereafter landing the fish in the boat.

Under ordinary circumstances, when a comparatively large fish is drawn alongside of the boat, he is not always easy to land. Confronted with this difficulty, and with the unnecessary loss of the partially made catch, we have evolved and produced a simple and reliable gun-style contrivance, whereby to securely grapple the fish while still in the water and alongside of the boat, and to insure safe handling during the landing stage in the capture.

Briefly, the preferred embodiment of the invention is characterized by a longitudinally elongated reach member or handle provided at one end with a convenient pistol grip, and provided at the opposite end with a body embracing member or grapple, there being associated with the hook and handle a trigger released projectible and retractable spear arranged to penetrate a predetermined portion of the fish so as to securely hold the same and expedite lifting into the boat or elsewhere before detachment from the fishing line.

Other features and advantages will become more readily apparent from the following description and the accompanying illustrative drawings.

In the drawings, wherein like numerals are employed to designate like parts throughout the views:

Figure 1 is a side elevational view of the fish spearing and handling device as designed and perfected in accordance with the principles of the present invention.

Figure 2 is a view partly in section and partly in elevation utilized primarily to detail the trip and trigger arrangement and construction.

Figure 3 is a view also partly in section and elevation, showing the pointed or spear end of the spring pressed projectible and retractable plunger rod.

Figure 4 is an enlarged end view of Figure 1 observing it in a direction from left to right.

Figure 5 is an enlarged partial detail section on the plane of the line 5—5 of Figure 1.

Considering the general external appearance of the structure as a unitary device, it may be said to resemble a pistol grip equipped gun style fish grappling and harpooning spear. The aforementioned longitudinally elongated reach member comprises a cylinder or tube 6 and this functions as a barrel for housing the major portion of the projectible and retractable plunger rod 7. Incidentally, the rod is tapered and pointed at one end as at 8 and on the opposite end is provided with a hand gripping knob 9. Then too, as shown in Figure 2, it is provided on one side with a groove forming a keyway 10 to prevent axial turning. Adjacent to the groove it is provided with a notch 11 constituting a keeper and forming a retention shoulder 12. The knob equipped end portion of the rod is slidable through the mechanism case or housing unitarily denoted by the numeral 13. That is to say, this housing embodies a frame 14 of polygonal form whose end members are provided with guides through which the rod slides. In addition we provide removable cover plates 15 to permit access to be had to the mechanism on the interior. On the interior as seen in Figure 2 the frame is provided with parallel lugs 16 to accommodate a pivot 17 for the substantially J-shaped lever member 18. This member has its long limb fashioned to provide a trigger 19 whose finger piece projects through and beyond the clearance slot 20 for movement within the confines of the trigger guard 21. The curved short limb 22 of said part 18 provides a trip or latch and this is engageable in the keeper notch 11 and is adapted to abut the stop shoulder 12. The numeral 23 merely designates a return spring for the trigger. Then too, as shown in Figure 5, there is a set-screw 24 in one of the side or cover plates and this projects into the groove 10 to function as a key or check element as well as a means to prevent axial rotation of the rod. Consequently, the keeper notch 11 and latch 22 are maintained in effective alignment at all times.

The handle may be conveniently referred to as a pistol grip, the same being indicated at 25. It is of any suitable design and located at an appropriate angle with respect to the casing 13. There is a bracket or fixture at 26 which is a guard to facilitate maintaining the hand against accidental slippage. By grasping the grip 25 so that the fingers encircle the same in proper relationship with respect to the guards 21 and 26, the hand is not apt to get into a dangerous position to be pinched or struck by the sliding movement of the knob equipped rod 7.

Reference being had now to the grapple, this is denoted by 27 and is of suitable proportions and is generally U-shaped in form. The end portion 28 is provided with a tapered aperture 29 to permit convenient passage therethrough of the penetrating point 8. This feature 29 is in effect a guide eye for said point. The opposite arm portion 30 of the hook terminates in a laterally disposed internally screw-threaded socket 31 into which the screw-threaded end of the tubular barrel 6 is screwed as shown to advantage in Figure 3. Incidentally, a lock nut 32 is here employed to maintain proper assemblage of parts. Then too, a suitable collar or shoulder 33 is provided on the rod and is engageable with the socket 31 to limit the projectible action of the rod. Manifestly, the rod is preferably projected forcibly to a penetrating position through the instrumentality of a coiled spring 34. As shown in the drawings, the spring 34 surrounds the rod, is confined in the barrel 6 and bears at one end against the shoulder forming collar 33 and at the opposite end against the casing or frame member 14 (see Figure 2). An auxiliary cushioning spring 34a also surrounds the rod, this being interposed between the collar 33 and the apertured end of the enclosing socket 31.

This invention has been satisfactorily constructed and used to adequately land fish weighing anywhere from seven to twenty-four pounds. When properly handled, it will not injure the fish to any appreciable extent. It is obvious that after the plunger or spear rod is retracted and cocked, the grapple 27 is placed about the desired portion (preferably the head) of the fish. While holding the pistol grip and properly aiming the spear, the trigger is tripped to release the spear which, under the action of the spring is forcibly driven through the fish, thereby to secure the same. When once trapped in this device, the fish can be readily handled and safely removed from the fishing line and thereafter pulled out of the water and landed in the boat.

While the preferred embodiment of the invention has been shown and described, it is to be understood that minor changes coming within the field of invention claimed may be resorted to if desired.

We claim:

1. A fish grappling and spearing implement comprising a reach member having handle means at one end and a grapple fixed securely at the opposite end, and a trip released pressure operated plunger rod slidably mounted in said reach member and handle means and having a pointed spear at its free end adapted to bridge the open side of the grapple as described.

2. In a fish handling and landing device of the class described, a longitudinally elongated reach member having rigid means at its outer end to partially embrace the body of the victim, a spring pressed spear slidably mounted in said reach member and projectible and retractable in relation to the body embracing means, and a hand grip carried by said reach member.

3. A fish handling device of the class described comprising a casing, a barrel attached to and projecting from said casing, a pistol grip attached to said casing, a plunger rod slidable in said casing and barrel, a rod-projecting spring surrounding the rod and confined in said barrel, said rod being pointed at one end to function as a spear, being provided at its opposite end with a retracting hand knob, a trigger mounted in said casing, a trip on said trigger, said rod being provided with a shoulder with which said trip is releasably engageable, and a fish grapple fixedly mounted on the outer end of said barrel.

4. In a fish handling device of the class described, a casing provided with a laterally directed pistol grip, a pivotally mounted trigger in said casing, a trigger guard cooperable with the grip and casing, a return spring for said trigger, a trip latch carried by said trigger, a barrel attached to one end of the casing and extending longitudinally therefrom, a coiled spring confined in said barrel, a plunger rod slidable in the barrel and casing, said casing having guides through which portions of the rod slide, a knob on one end of the rod, a pointed spear on the opposite end of the rod, said rod having a detent shoulder with which said trip is releasably engageable, the rod having its pointed end projectible through and beyond the adjacent end of said barrel, and a substantially U-shaped grapple rigidly secured on the last named end of said barrel with which said pointed end has closing relationship.

5. In a fish spearing and handling device of the class described, a substantially U-shaped grapple adapted to partially embrace the speared victim, one end portion thereof being provided with a laterally disposed socket, the opposite end thereof being in alignment with said socket and provided with a spear point accommodation aperture, a barrel having one end portion fastened in said socket and projecting therefrom in axial alignment with the socket and the aforementioned spear accommodation aperture, handle means on the opposite end of the barrel, a spring projected plunger slidably mounted in said barrel, manually releasable trip means carried by and cooperable with the handle means, said socket being provided with an opening through and beyond which the plunger rod is projectible, said plunger rod being adapted to bridge the open side of said grapple and having on its free end a spear point projectible through said aperture.

PAUL M. THOMPSON.
JOHN R. THOMPSON.